(12) United States Patent
Wu

(10) Patent No.: US 7,967,351 B2
(45) Date of Patent: Jun. 28, 2011

(54) SUCTION DEVICE

(75) Inventor: Hung-Chen Wu, Tu-Cheng (TW)

(73) Assignee: Chi Mei Communication Systems, Inc., Tu-Cheng, New Taipei (TW)

(*) Notice: Subject to any disclaimer, the term of this patent is extended or adjusted under 35 U.S.C. 154(b) by 229 days.

(21) Appl. No.: 12/334,636

(22) Filed: Dec. 15, 2008

(65) Prior Publication Data

US 2009/0263263 A1  Oct. 22, 2009

(30) Foreign Application Priority Data

Apr. 16, 2008 (CN) .................. 2008 1 0301164

(51) Int. Cl.
*B66C 15/06* (2006.01)
(52) U.S. Cl. ...................................... 294/64.1
(58) Field of Classification Search ............. 294/64.1, 294/65; 901/40; 414/627; 271/91, 104, 271/106

See application file for complete search history.

(56) References Cited

U.S. PATENT DOCUMENTS

| | | | | |
|---|---|---|---|---|
| 3,866,764 | A | * | 2/1975 | Leiser .................... 271/104 |
| 4,121,865 | A | * | 10/1978 | Littwin, Sr. ............. 294/64.1 |
| 4,397,491 | A | * | 8/1983 | Anderson ............... 294/64.1 |
| 7,878,564 | B2 | * | 2/2011 | Kang et al. ............. 294/64.1 |

* cited by examiner

*Primary Examiner* — Paul T Chin
(74) *Attorney, Agent, or Firm* — Steven M. Reiss

(57) ABSTRACT

A suction device (10) is described. The suction device (10) includes a cylinder (11) having a semi-closed end (113), a suction tip (13) connected to the semi-closed end (113), a piston (12), an elastic member (16) and an electromagnetic member (17). The piston (12) is slidably received in the cylinder (11), the piston (12) and the semi-closed end (113) encloses a working chamber (122). One end of the elastic member (16) is connected to the cylinder (11), the other end is connected to the piston (12). The electromagnetic member (17) causes the piston (12) to slide back and forth in the cylinder (11) to vary the volume of the working chamber (122) by adjusting the magnetic field of the electromagnetic member (17).

15 Claims, 6 Drawing Sheets

SUCTION DEVICE

BACKGROUND

1. Field of the Invention

The present invention relates to suction devices and, particularly, to a suction device using negative air pressure.

2. Description of Related Art

Suction devices are typically used to transfer and position workpieces (e.g., electronic components). The suction device usually includes a vacuum pump, a suction tip and an air pipe. The suction tip has a suction surface which is connected to the vacuum pump via the air pipe such that a negative air pressure is generated to suck workpieces into firm contact with the suction surface.

However, vacuum pumps can be expensive and inconvenient to carry. Furthermore, the air pipe for the vacuum pump is soft and easily bent during suction. Bent air pipes often lead to an unstable negative air pressure for the suction tip, thereby degrading the positioning or transferring of the workpieces.

Therefore, there is room for improvement within the art.

BRIEF DESCRIPTION OF THE DRAWINGS

Many aspects of the suction device can be better understood with reference to the following drawings. These drawings are not necessarily drawn to scale, the emphasis instead being placed upon clearly illustrating the principles of the present suction device. Moreover, in the drawings like reference numerals designate corresponding sections throughout the several views.

DETAILED DESCRIPTION OF EXEMPLARY EMBODIMENT

Figure 1:
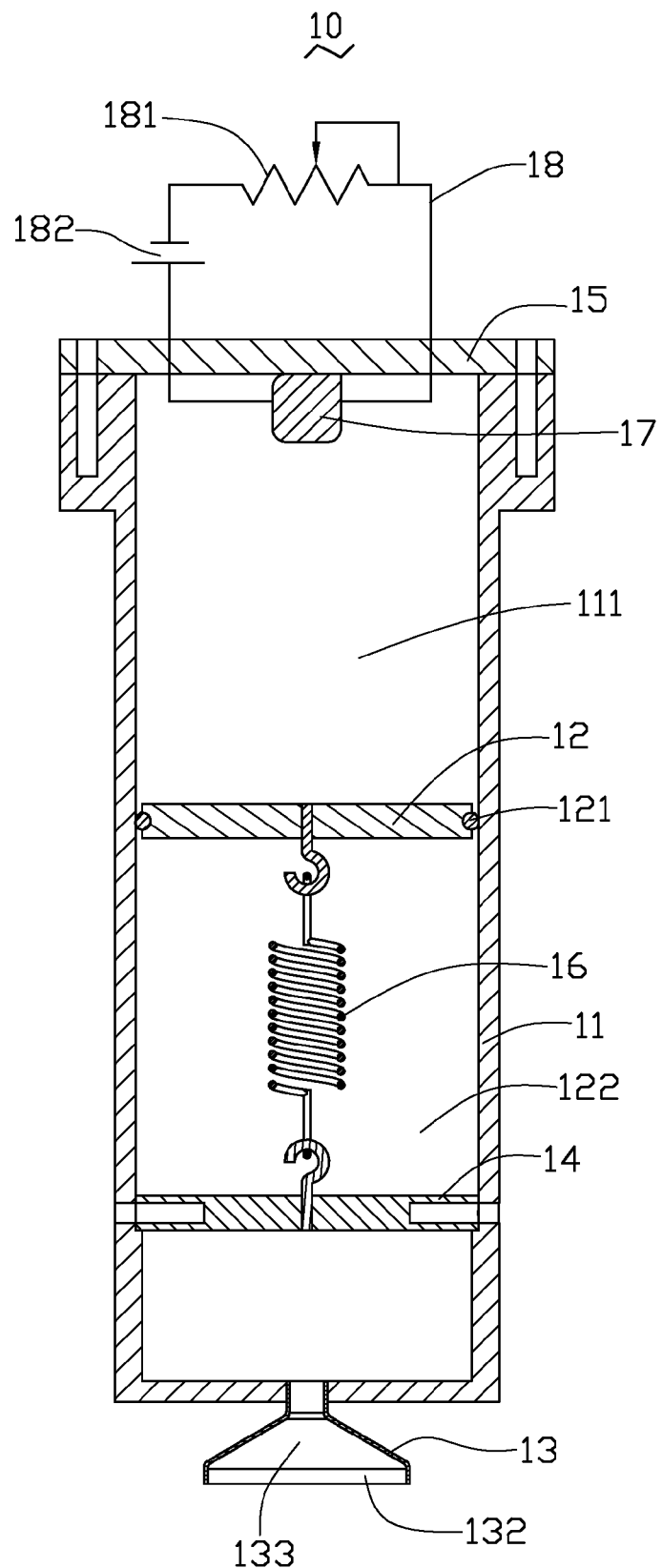
FIG. 1 is a cross-sectional view of a suction device, in accordance with an exemplary embodiment.
Figure 2:
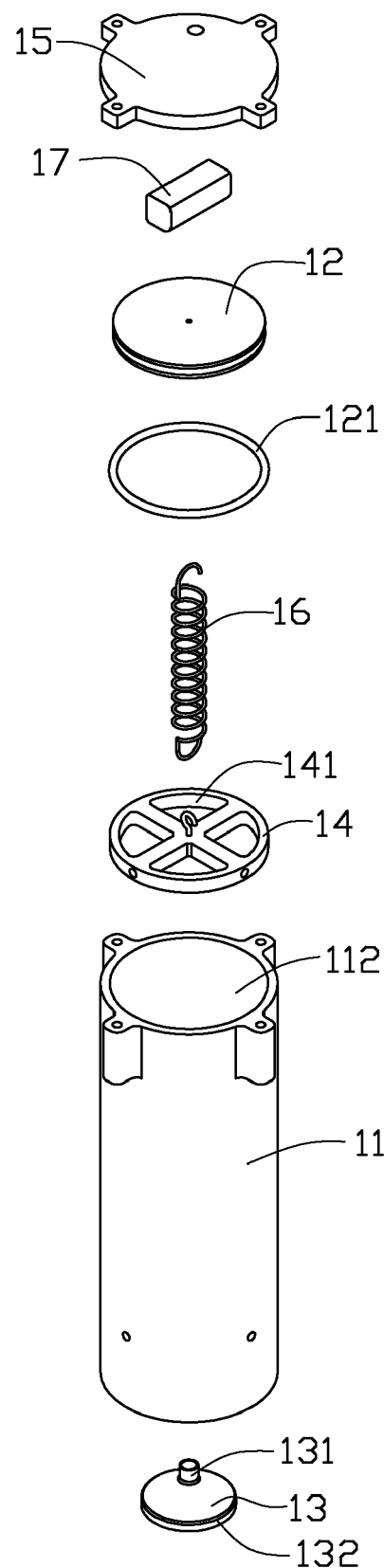
FIG. 2 is an exploded, isometric view of the suction device without the controlling circuit shown in FIG. 1.
Figure 3:
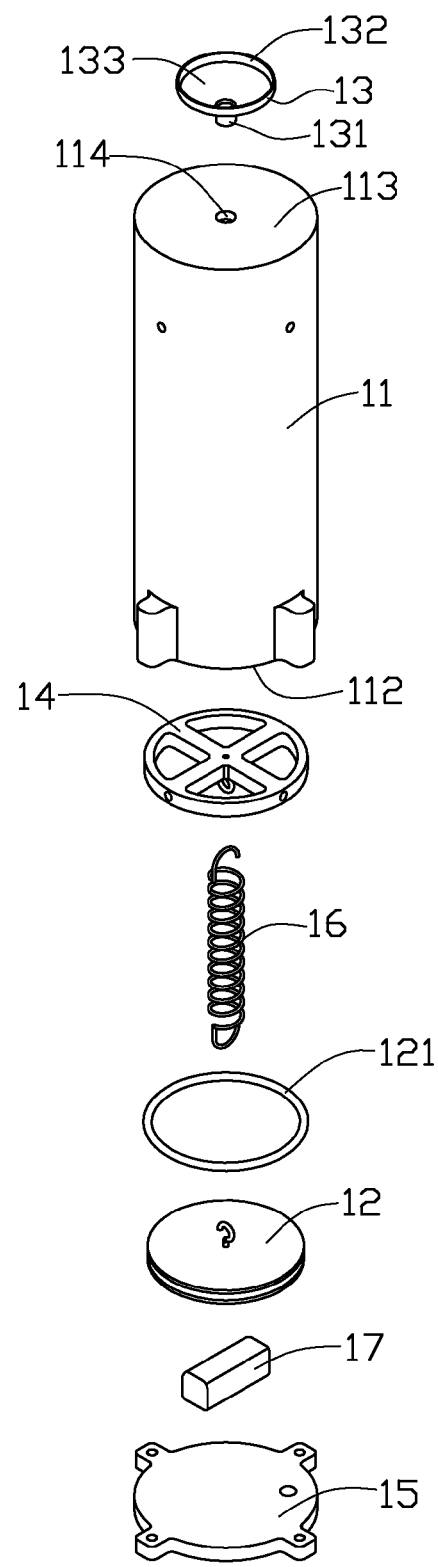
FIG. 3 is another exploded, isometric view of the suction device without the controlling circuit shown in FIG. 1.
Figure 4:
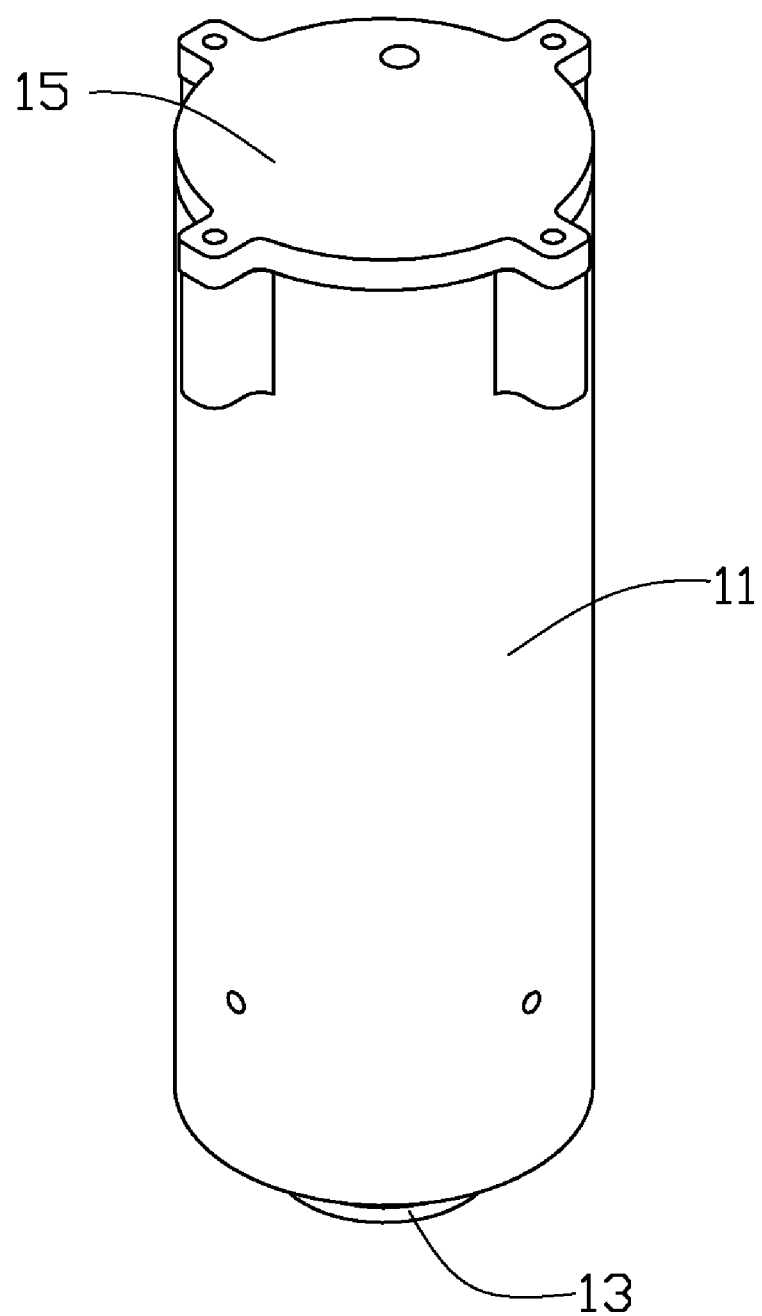
FIG. 4 is an isometric view of the suction device without the controlling circuit shown in FIG. 1.
Figure 5:
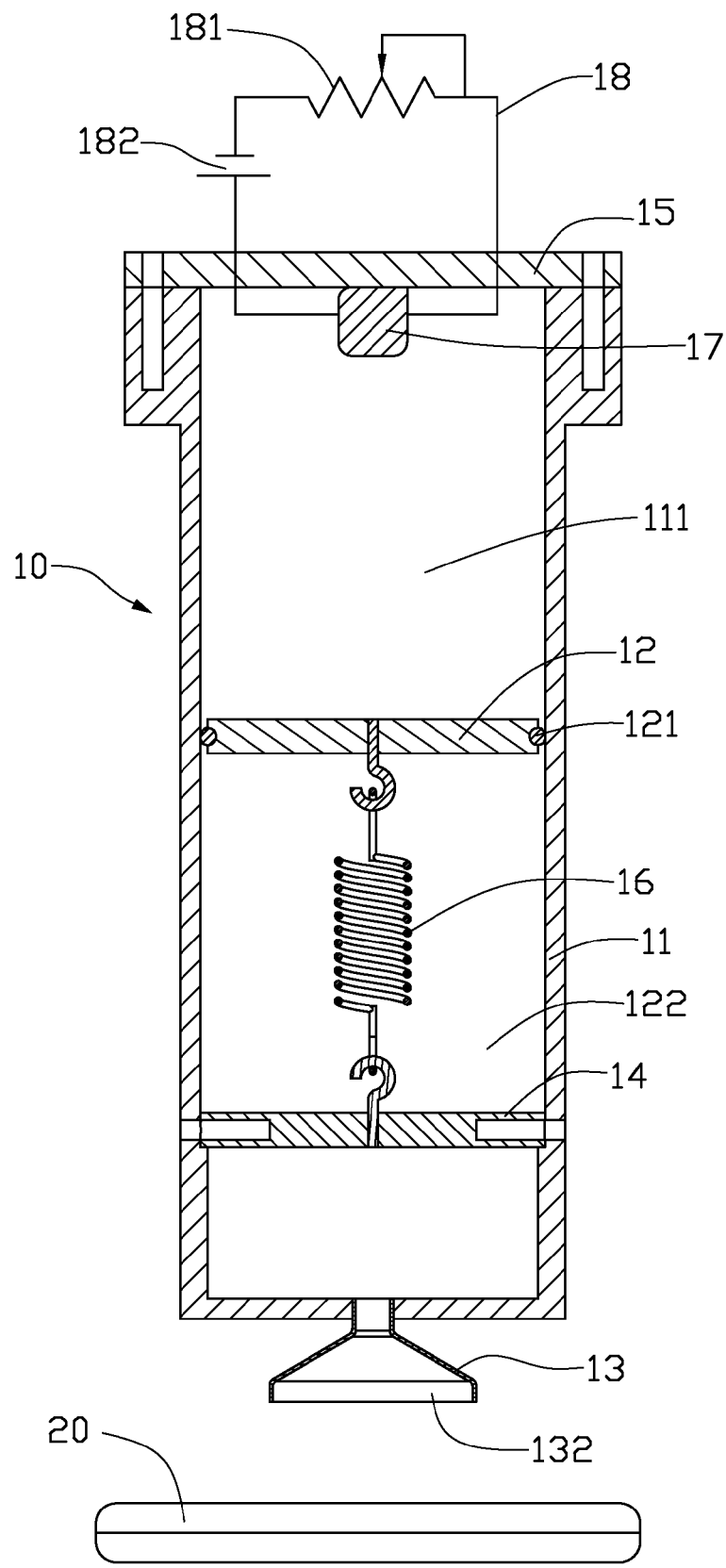
FIG. 5 is a first cross-sectional view of the suction device in use shown in FIG. 1.
Figure 6:
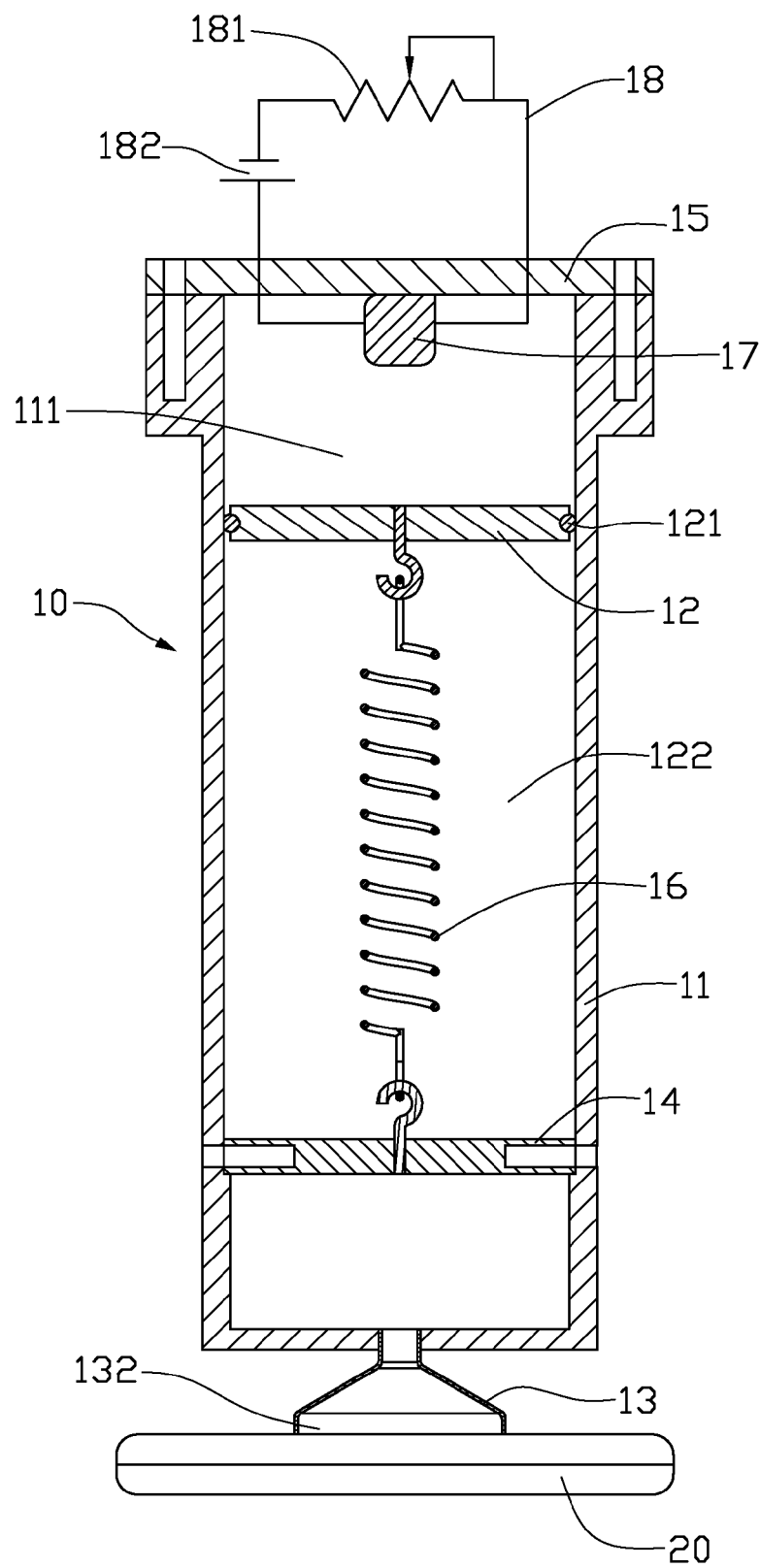
FIG. 6 is a second cross-sectional view of the suction device in use shown in FIG. 1.

The exemplary suction device 10 shown in FIGS. 1 through 3 is used to provide suction to position/transfer an electronic device, such as a mobile phone 20 (see FIGS. 5 and 6).

The suction device 10 includes a cylinder 11, a piston 12, a suction tip 13, a positioning board 14, a cylinder cap 15, an elastic member 16, an electromagnetic member 17, and a controlling circuit 18.

The cylinder 11 includes an opening end 112, an opposite semi-enclosed end 113 (best seen in FIG. 3) and a chamber 111 formed between the opening end 112 and the semi-enclosed end 113. The semi-enclosed end 113 defines a hole 114.

The piston 12 can be slidably received in the chamber 111. A seal 121 is arranged between the piston 12 and the cylinder 11 to define a working chamber 122 in the cylinder 11. The piston 12 with the seal 121 divides the cylinder 11 into two parts: the chamber 111 and the working chamber 122. The volume of the working chamber 122 can be adjusted by sliding the piston 12 within the chamber 111. The piston 12 is made of a soft magnetic material.

The suction tip 13 includes a connecting end 131, a tip end 132 and a passage 133 communicating the connecting end 131 with the tip end 132. The connecting end 131 is used to connect to the through hole 114, thus placing the ambient air in fluid communication with the working chamber 122. The tip end 132 is configured for sucking the mobile phone 20, which then blocks ambient air from entering the suction tip 13 and the working chamber 122.

The positioning board 14 is fixed (e.g., screwed) into the cylinder 11 adjacent to the semi-enclosed end 113. The positioning board 14 defines four holes 141. The holes 141, the working chamber 122 and the passage 133 communicate with each other.

The elastic member 16 is a coil spring. One end of the elastic member 16 hooks to the piston 12, the opposite end hooks to the positioning board 14.

The electromagnetic member 17 may be attached to the inner surface of the cylinder cap 15. The cylinder cap 15 can be securely mounted on the opening end 112 of the cylinder 11 such that the electromagnetic member 17 is received in the chamber 111.

The controlling circuit 18 includes an adjustable resistor 181 and a power supply 182. The adjustable resistor 181, the power supply 182 and the electromagnetic member 17 serially connect with each other to form an electrical loop. The adjustable resistor 181 allows the magnetic field of the electromagnetic member 17 to be changed, so that a magnetic force for attracting the piston 12 can be accordingly adjusted.

FIGS. 5 and 6 show the usage of the suction device 10. In use, the tip end 132 is completely placed in contact with the mobile phone 20 such that the mobile phone completely blocks the tip end 132. The magnetic field of the electromagnetic member 17 is then gradually increased by adjusting the adjustable resistor 181, to attract the piston 12 to slide towards the opening end 112 until a biasing force of the elastic member 16 is equal to the magnetic force. At this time, since the working chamber 122 is sealed from ambient air, as the piston 12 moves and the working chamber 122 becomes larger, the pressure in the working chamber 122 decreases. When the ambient air pressure is higher than the air pressure of the working chamber 122, the suction tip 13 sucks the mobile phone 20 on the tip end 132 and can be used to lift and move the mobile phone 20 from one position to other positions.

To release the mobile phone 20, the magnetic field of the electromagnetic member 17 is gradually weakened by re-adjusting the adjustable resistor 181, so the piston 12 slides towards the semi-enclosed end 113 under the biasing force of the elastic member 16. In such case, as the volume of the working chamber 122 decreases, the pressure in the working chamber 122 increases. When the pressure in the working chamber 122 equals the ambient air pressure, the mobile phone 20 is detached from the tip end 132, accordingly.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of sections within the principles of the invention to the full extent indicated by the broad general meaning of the terms, in which the appended claims are expressed.

What is claimed is:

1. A suction device, comprising:
   a cylinder having a first end and a second end opposite to the first end;
   a suction tip connecting to an open portion of the first end;

a piston slidably received in the cylinder, the piston and the first end enclosing a working chamber;

an elastic member, one end of the elastic member being connected to the cylinder, the other end of the elastic member being connected to the piston; and an electromagnetic member mounted to the second end of the cylinder and opposite to the piston, the electromagnetic member being for causing the piston to slide back and forth in the cylinder to vary the volume of the working chamber by adjusting the magnetic field of the electromagnetic member.

2. The suction device as claimed in claim 1, further including a controlling circuit, wherein the electromagnetic member is electrically connected to the controlling circuit.

3. The suction device as claimed in claim 2, wherein the controlling circuit includes an adjustable resistor and a power supply, the adjustable resistor, the power supply and the electromagnetic member form a current loop in series.

4. The suction device as claimed in claim 1, further including a positioning board, wherein the positioning board is fixed to the cylinder and adjacent to the first end, one end of the elastic member is connected to the positioning board.

5. The suction device as claimed in claim 1, wherein the suction device further includes a cylinder cap mounted to the second end opposite to the first end of the cylinder, the electromagnetic member is mounted on the inner surface of the cylinder cap and received in the cylinder.

6. The suction device as claimed in claim 1, wherein the suction tip includes a tip end, a connecting end and a passage, the connecting end connect the connecting end to the tip end, the passage communicating with the working chamber.

7. The suction device as claimed in claim 1, wherein a seal is arranged between the piston and the cylinder, dividing the cylinder into the working chamber and a chamber.

8. A method for gripping and moving an article, comprising:

providing a cylinder device defining a working chamber and having a suction opening located at a first end of the cylinder, the suction opening placing the working chamber in communication with the ambient environment;

positioning a slidable magnetic piston in the cylinder device to define the volume of the working chamber;

mounting an electromagnet on a second end of the cylinder device opposite to the first end, the electromagnet being used to slide the magnetic piston in a first direction, whereby the volume of the working chamber can be increased and in a second direction, whereby the volume of the working chamber can be decreased;

blocking the suction opening with an article to be moved, thereby preventing fluid communication between the working chamber and the ambient environment;

such that, when the volume of the working chamber is increased, the pressure within the working chamber decreases and the article becomes fixed to the cylinder device.

9. A suction device for holding workpiece, comprising:

a cylinder having a first end;

a suction tip connecting to an open portion of the first end;

a piston slidably received in the cylinder, the piston and the first end enclosing a working chamber;

an elastic member, one end of the elastic member being connected to the cylinder, the other end of the elastic member being connected to the piston; and an electromagnetic member mounted to the cylinder;

wherein when the magnetic field of the electromagnetic member is increased, the electromagnetic attracts the piston to slide away from the first end to decrease the pressure of the working chamber so the suction tip applies holding force on workpiece, the elastic member is lengthened to accumulate elastic force; when the magnetic field of the electromagnetic member is weakened, the piston slides towards the first end under the elastic force of the elastic member to increase the pressure of the working chamber so the suction tip releases the workpiece.

10. The suction device as claimed in claim 9, further including a controlling circuit, wherein the electromagnetic member is electrically connected to the controlling circuit.

11. The suction device as claimed in claim 10, wherein the controlling circuit includes an adjustable resistor and a power supply, the adjustable resistor, the power supply and the electromagnetic member form a current loop in series.

12. The suction device as claimed in claim 9, further including a positioning board, wherein the positioning board is fixed to the cylinder and adjacent to the first end, one end of the elastic member is connected to the positioning board.

13. The suction device as claimed in claim 9, wherein the suction device further includes a cylinder cap mounted to the second end opposite to the first end of the cylinder, the electromagnetic member is mounted on the inner surface of the cylinder cap and received in the cylinder.

14. The suction device as claimed in claim 9, wherein the suction tip includes a tip end, a connecting end and a passage, the connecting end connect the connecting end to the tip end, the passage communicating with the working chamber.

15. The suction device as claimed in claim 9, wherein a seal is arranged between the piston and the cylinder to divide the cylinder into the working chamber and a chamber.

* * * * *